H. P. HOYLE.
APPARATUS FOR WASHING COAL OR THE LIKE AND FOR SEPARATING IT FROM ITS IMPURITIES.
APPLICATION FILED AUG. 29, 1921.

1,418,442.

Patented June 6, 1922.

7 SHEETS—SHEET 2.

H. P. HOYLE.
APPARATUS FOR WASHING COAL OR THE LIKE AND FOR SEPARATING IT FROM ITS IMPURITIES.
APPLICATION FILED AUG. 29, 1921.

1,418,442. Patented June 6, 1922.

7 SHEETS—SHEET 3.

Inventor:
Henry Patrick Hoyle
By his Attorneys,

H. P. HOYLE.
APPARATUS FOR WASHING COAL OR THE LIKE AND FOR SEPARATING IT FROM ITS IMPURITIES.
APPLICATION FILED AUG. 29, 1921.

1,418,442.

Patented June 6, 1922.

7 SHEETS—SHEET 6.

Inventor:
Henry Patrick Hoyle
By his Attorneys

H. P. HOYLE.
APPARATUS FOR WASHING COAL OR THE LIKE AND FOR SEPARATING IT FROM ITS IMPURITIES.
APPLICATION FILED AUG. 29, 1921.

1,418,442.

Patented June 6, 1922.

7 SHEETS—SHEET 7.

Inventor:
Henry Patrick Hoyle
By his Attorneys

UNITED STATES PATENT OFFICE.

HENRY PATRICK HOYLE, OF DURHAM, ENGLAND.

APPARATUS FOR WASHING COAL OR THE LIKE AND FOR SEPARATING IT FROM ITS IMPURITIES.

1,418,442.             Specification of Letters Patent.     Patented June 6, 1922.

Application filed August 29, 1921. Serial No. 496,558.

*To all whom it may concern:*

Be it known that I, HENRY PATRICK HOYLE, a subject of the King of Great Britain, residing at 46 North Bailey, Durham, England, have invented new and useful Improvements in Apparatus for Washing Coal or the like and for Separating it from Its Impurities, of which the following is a specification.

This invention relates to improvements in apparatus for washing coal or the like and separating it from its impurities.

Apparatus according to this invention comprises a reciprocating paddle or piston provided with valves and combined with an inclined mesh plate so that progressively reduced agitation is produced only during the forward stroke of the paddle or piston, whereby material while being progressively agitated or separated is also steadily carried down the mesh plate.

The accompanying drawings illustrate apparatus made in accordance with this invention.

Figure 1:
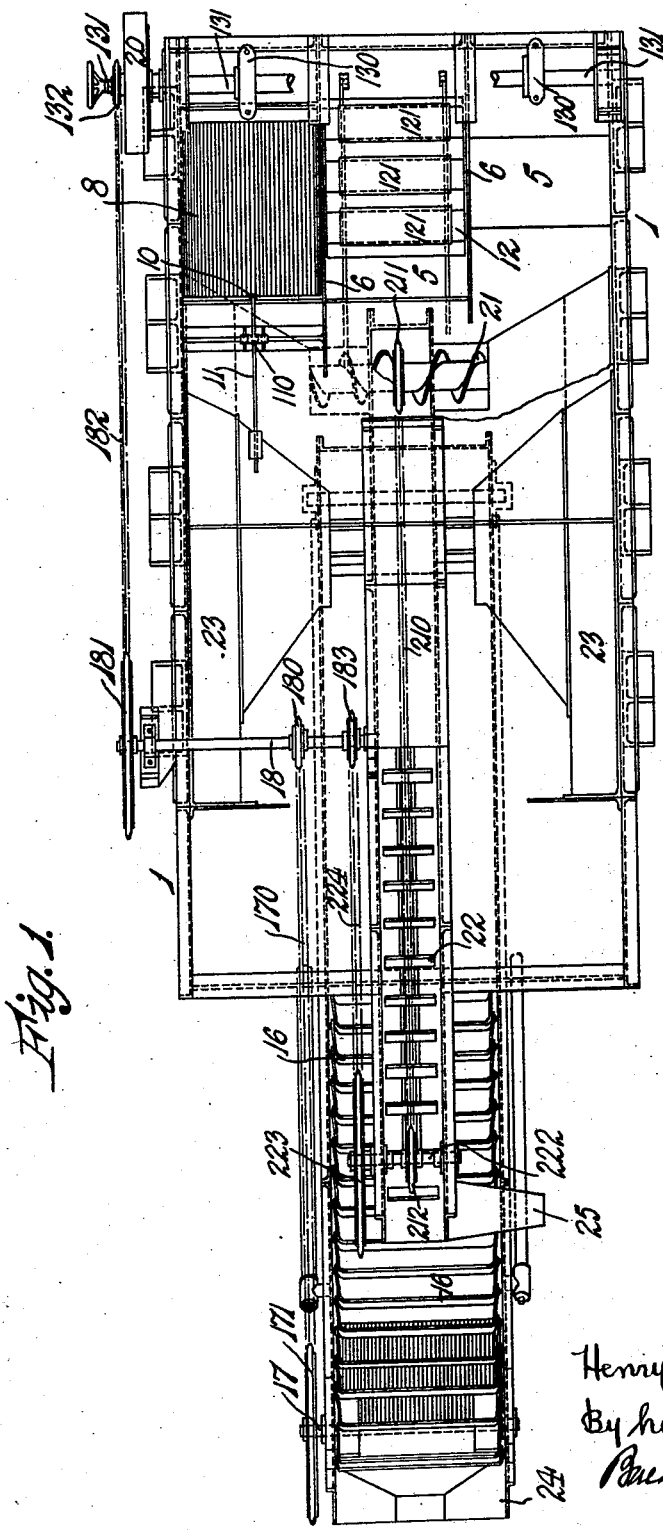
Figure 2:
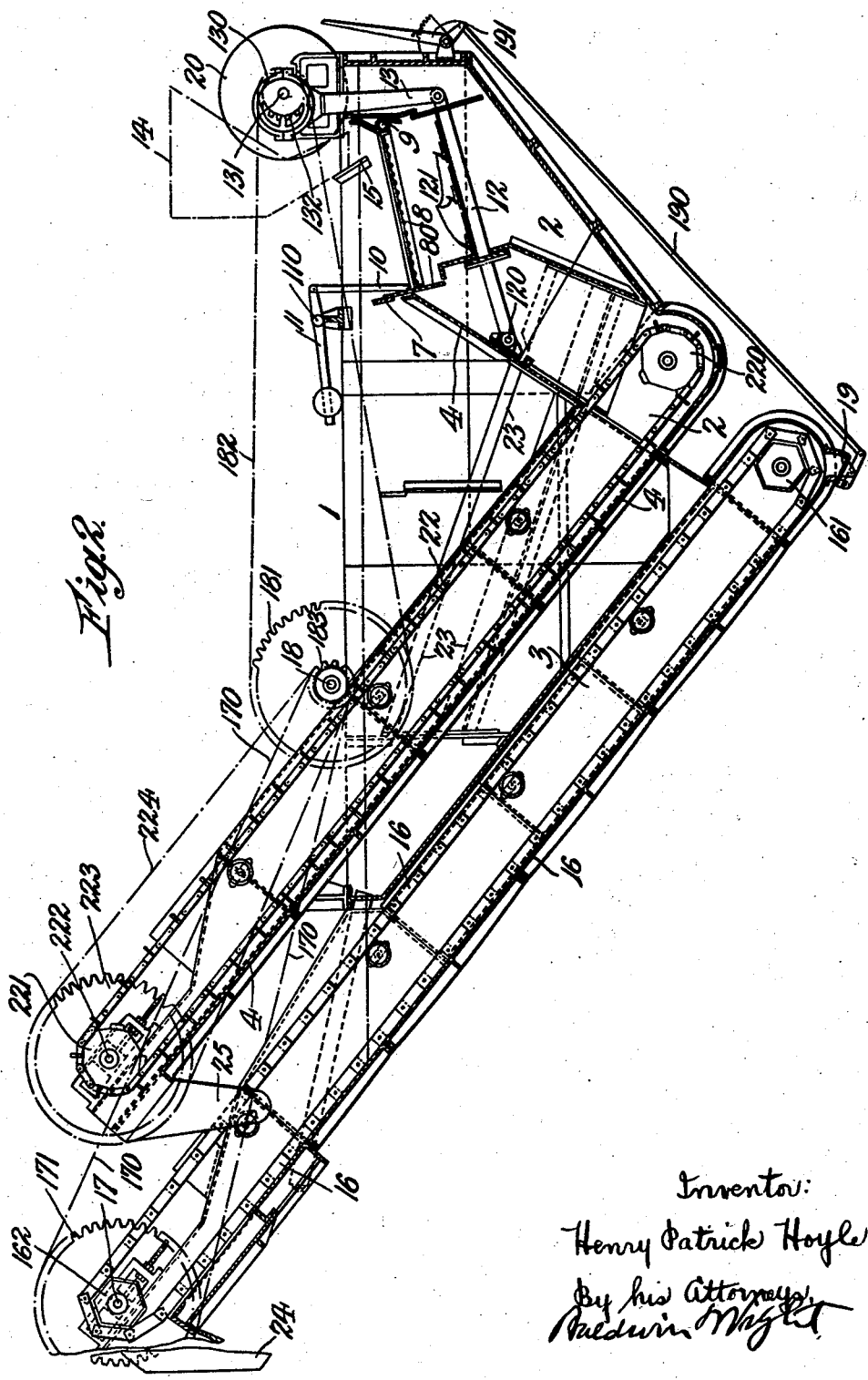
Figure 3:
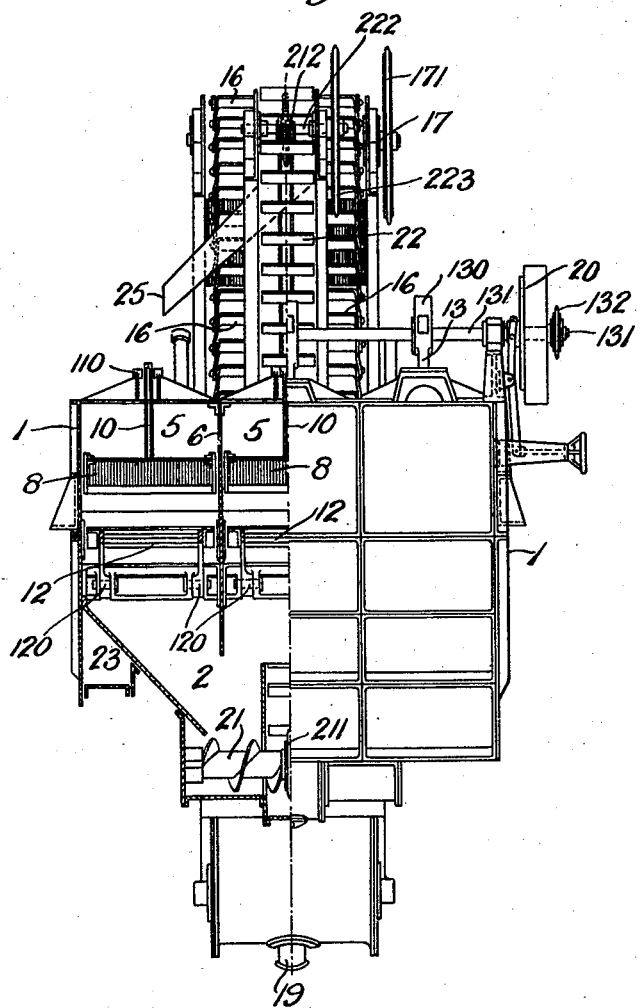
Figure 4:
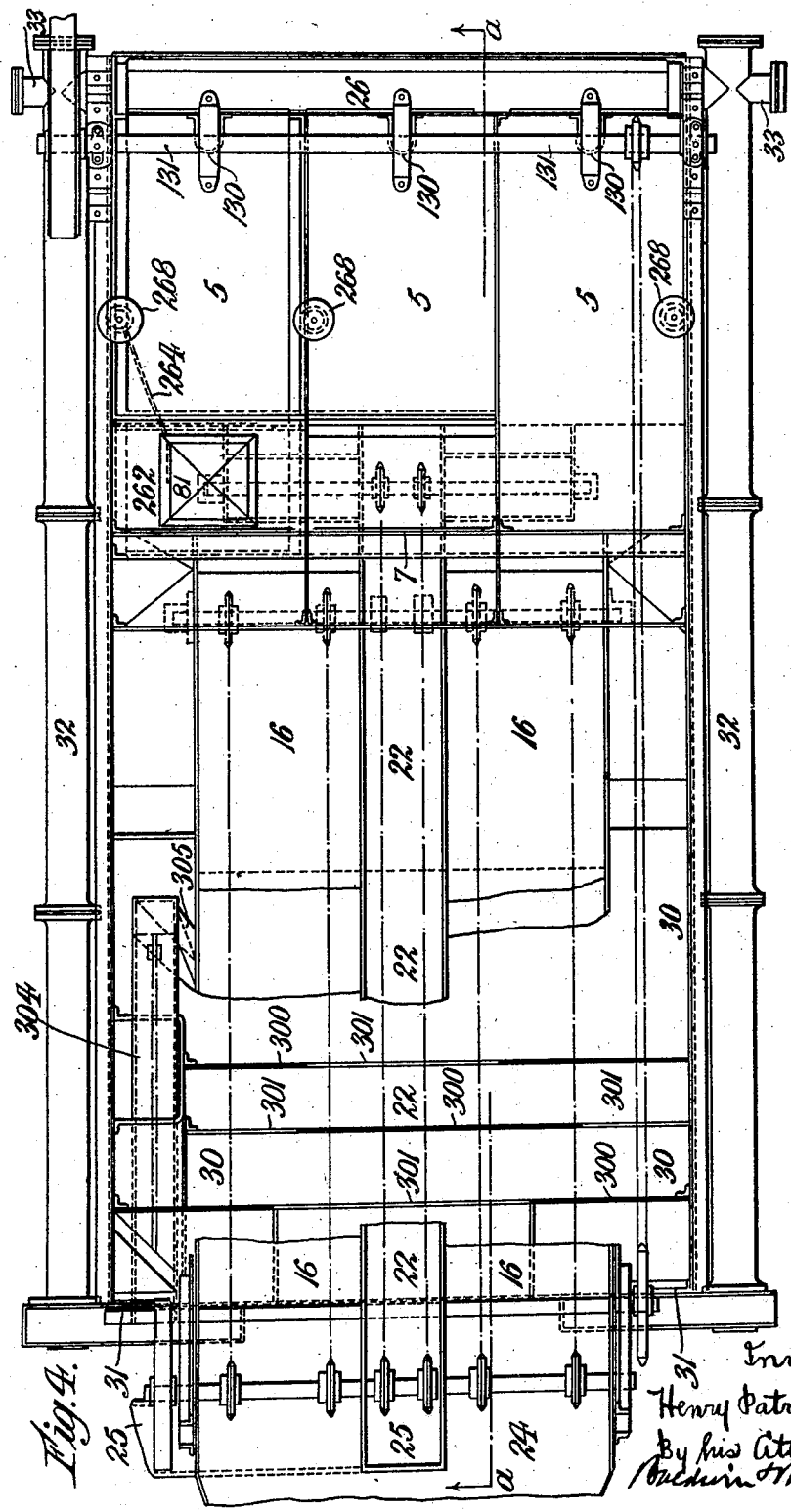
Figure 5:
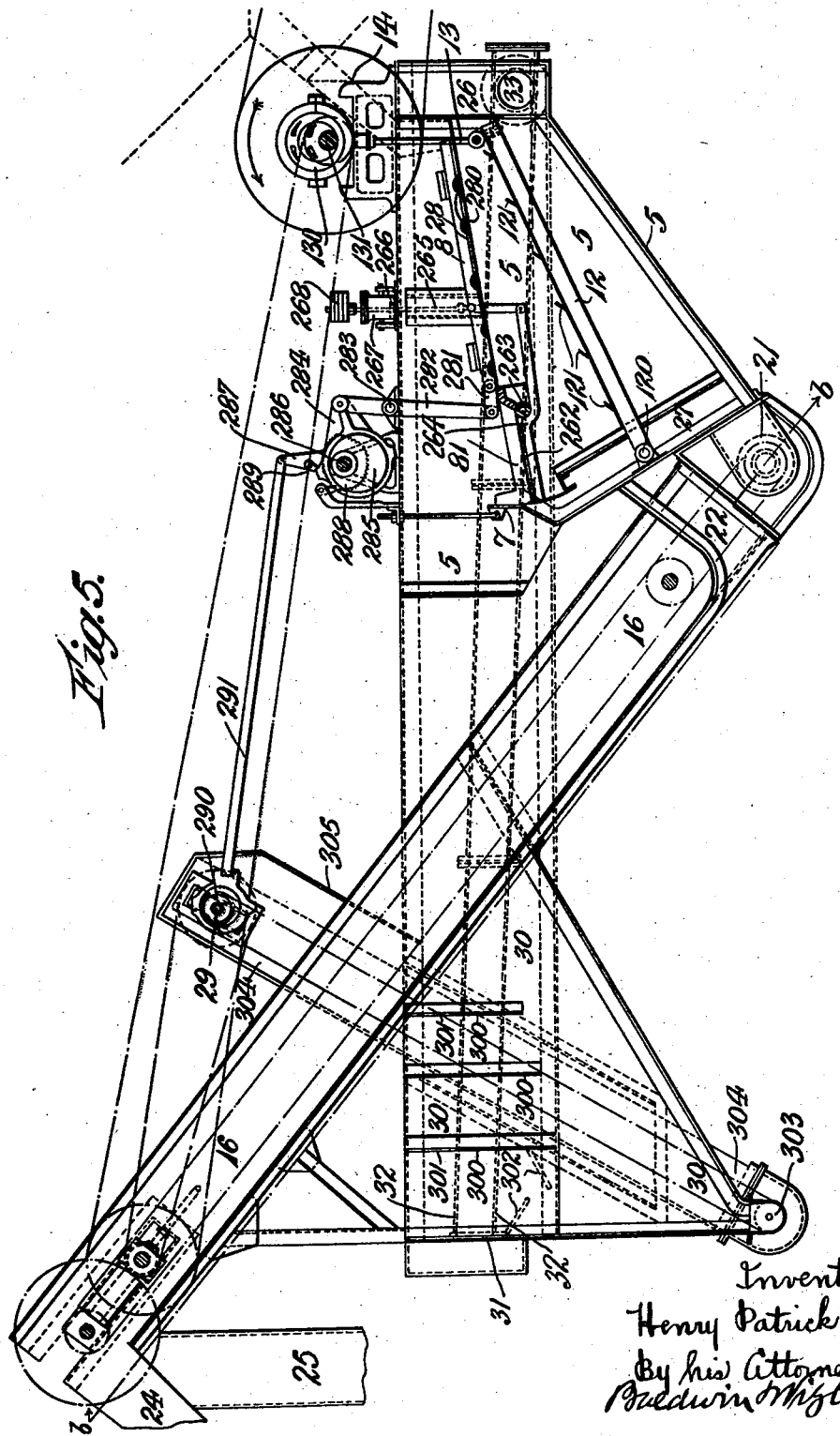
Figure 6:
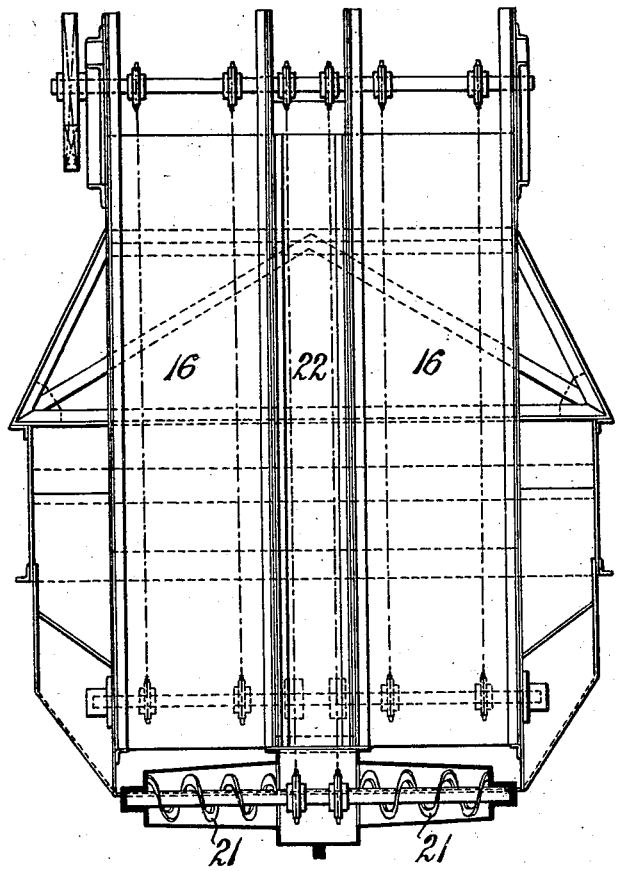
Figure 8:
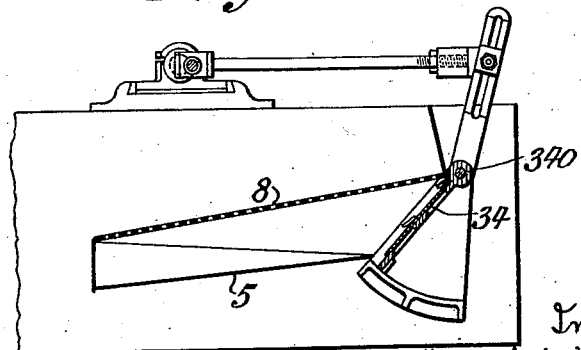
Figure 7:
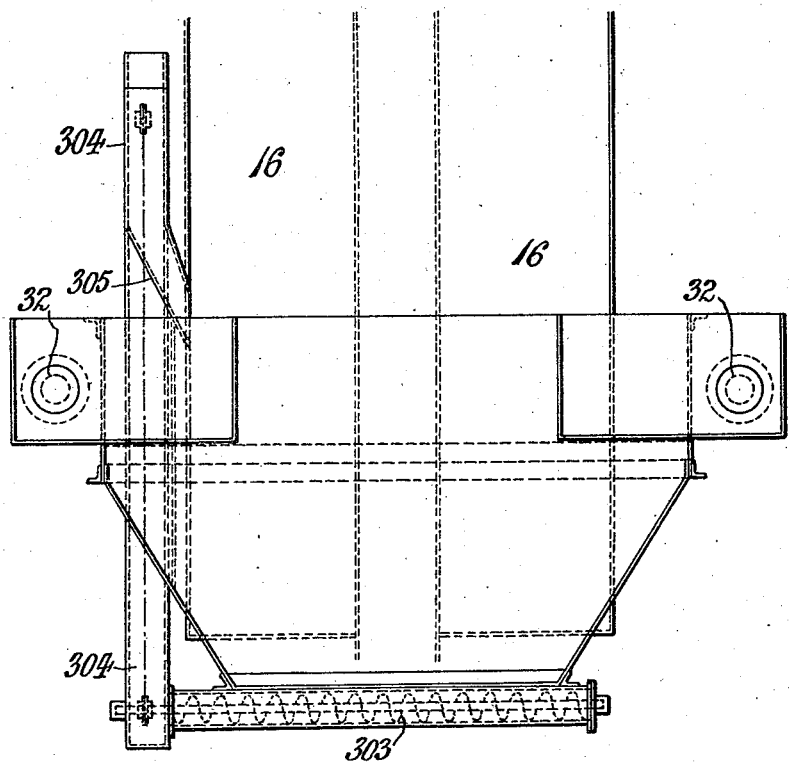
Figure 9:
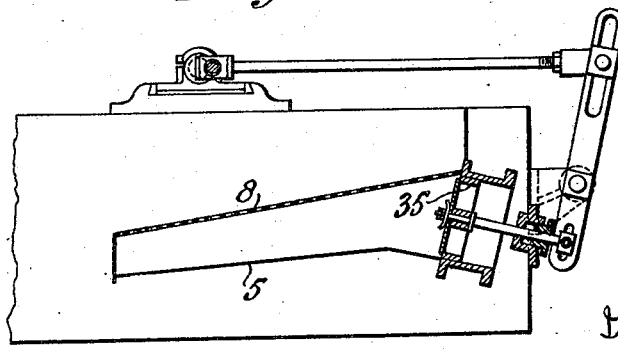

Figure 1 is a plan, partly in section, Figure 2 a longitudinal section and Figure 3 a right hand end elevation partly in section. Figure 4 is a plan, Figure 5 a longitudinal section on the line $a$—$a$, Figure 4, Figure 6 a section on the line $b$—$b$, Figure 5, and Figure 7 an end elevation of another machine. Figures 8 and 9 show modifications of the paddles.

A tank 1 is divided into two parts 2 and 3, by a partition 4, the impurities being collected in part 2 and the coal in part 3. At the right hand end of part 2 are three pockets 5, separated from each other by partitions 6 and from the rest of part 2 by adjustable weirs 7. In each of the pockets 5 is a grid 8 pivoted at 9 and held in position by a link 10 connected to a weighted lever 11 which is pivoted at 110. Beneath each grid 8 is a paddle 12 pivoted at 120 and connected to a rod 13 mounted on an eccentric 130 on a shaft 131. In the paddle 12 are valves 121 which close during the upward or forward stroke of the paddle forcing water through the grids 8. Coal is supplied to the grids 8 through a chute 14 to the top end of the grids where it is held by adjustable plates 15. In part 3 is an elevator 16 passing round pulleys 161 and 162. The pulley 162 is mounted upon a shaft 17 upon which is a sprocket wheel 171 driven by a chain 170 from another sprocket wheel 180 on a shaft 18 upon which is a sprocket wheel 181 driven by a chain 182 from another sprocket wheel 132 on the shaft 131.

At the lower end of part 3 is a valve 19 actuated through a link 190 by a hand lever 191. When it is desired to change the water, the valve 19 is opened but before so doing rotation of the driving shaft 131 and the paddles 12 is stopped by means of a clutch 20.

In part 2 is a worm 21 driven by means of a chain 210 passing over a sprocket wheel 211 on the worm and also over a sprocket wheel 212 on the shaft 222.

The worm 21 feeds the impurities to an elevator 22 passing round pulleys 220 and 221, the pulley 221 being mounted on the shaft 222 on which is a sprocket wheel 223, and a chain 224 passes over the sprocket wheels 223 and 183 on the shaft 18.

Part 2 has on each side culverts 23 through which the water overflows and is led round to the underside of the paddles 12. In operation coal passes down the chute 14 on to the grids 8 and being lighter than the impurities it is caused to flow over the weirs 7 and passing down part 3 of the tank is raised by the elevator 16 and delivered through a chute 24. The impurities gather on each grid 8 until their weight overcomes the weight on the lever 11 of the grid which then turns upon its pivot 9 allowing it to descend together with the plate 80 at its end, so that the impurities fall into the part 2 of the tank.

The impurities are collected by the worm 21 and are lifted out of the tank by the hoist 22 and delivered through a chute 25.

Referring to Figures 4 to 7, in each of three similar pockets 5 is a fixed inclined mesh plate 8 and a paddle 12 having one end pivoted at 120 and the other end attached to rods 13 actuated by eccentrics 130 on a shaft 131. In the paddle 12 are valves 121 which open during the down stroke of the paddle and close during the up stroke. Water is supplied to each pocket 5 through a compartment 26 and the coal to be washed is fed into a hopper and passes down a chute 14 on to the mesh plates 8. At the inner end of the mesh plates 8 are pockets 81 in which the dirt separated from the coal collects. The pockets 81 are provided with doors 262 hinged at 263 and connected to arms 264 pivotally connected to rods 265 upon which are pistons 266 working in dash pots 267. Upon the rods 265 are adjustable weights 268 which prevent the doors 262 from opening until a sufficient weight of dirt has accumulated in the pockets 81 to overcome the resistance of the weights 268. When the doors 262 are opened the dirt passes down a chute 27 through right and left hand worm conveyors 21 to an elevator 22 by which it is raised and discharged into a chute 25.

In order to prevent the holes in the mesh plates 8 from becoming clogged with dirt, frames 28 carrying scrapers 280 are arranged above them, the frames being connected by links 281 to the ends of levers 282 pivoted at 283, to the other ends of which are pivoted arms 284 forming the straps of eccentrics 285 on a shaft 286. Loose upon the shaft 286 is an arm 287 and fast with it is a ratchet wheel 288 with which a pawl 289 on the arm 287 engages. The arm 287 is actuated by an eccentric 290 on a shaft 29 through a connecting rod 291.

The coal, after being washed, passes from the mesh plates 8 over an adjustable weir 7 and by an elevator 16 to a coal chute 24, the water in the coal being drained from it during its passage up the elevator 16.

The water passing into the pocket 5 is caused, by the action of the paddles 12, to pass through the mesh plates 8, and the coal upon them, from whence it flows over the weir 7 into a settling tank 30 in which are vertical baffle plates 300 having in them openings 301 arranged out of line with each other, as more particularly shown in Figure 4. In the settling tank 30 are other baffle plates 302 which, together with the baffle plates 300, intercept the slurry, which settles at the bottom of the tank 30 from which it is removed by a conveyer 303 to an elevator 304 which delivers it through a chute 305 on to the coal elevator 16. Water from the settling tank 30 passes over adjustable weirs 31 to water pipes 32 connected to the compartment 26 through pipes 33.

Figure 8 shows a modification of the apparatus, in which a paddle 34 is pivoted at 340 and is oscillated about its pivot. Figure 9 shows another modification of the apparatus in which a reciprocating piston 35 is substituted for the paddle. In both modifications the action of the apparatus is similar to that above described.

What I claim is:—

1. Apparatus for washing coal and like material, comprising a tank divided into two parts, an inclined mesh plate pivoted at one end and attached to a balance weight at the other, a reciprocating paddle in the tank and located directly beneath the mesh plate, valves in the paddle adapted to close during the forward stroke and open during the reverse stroke, means for reciprocating the paddle, means for feeding material to the higher end of the mesh plate, a weir in the tank over which the coal passes, means for removing material from one part of the tank, and means for removing material from the other part.

2. Apparatus for washing coal and like material, comprising a tank divided into two parts, a reciprocating paddle in the tank, valves in the paddle adapted to close during the forward stroke and open during the reverse stroke, an inclined mesh plate, means for feeding material to the higher end of the mesh plate, a weir in the tank, a right and left hand screw and an elevator for removing material from one part, an elevator for removing material from the other part and means for reciprocating the paddle.

3. Apparatus for washing coal and like material, comprising a tank divided into two parts, a reciprocating paddle in the tank, valves in the paddle adapted to close during the forward stroke and open during the reverse stroke, an inclined mesh plate, pivoted at one end and attached to a balance weight at the other, means for feeding material to the higher end of the mesh plate, a weir in the tank, a right and left hand screw and an elevator for removing material from one part, an elevator for removing material from the other part and means for reciprocating the paddle.

4. Apparatus for washing coal and like material, comprising a tank divided into two parts, an inclined mesh plate, a reciprocating paddle in the tank and located directly beneath the mesh plate lying in a plane substantially parallel therewith, valves in the paddle adapted to close during the forward stroke and open during the reverse stroke, means for reciprocating the paddle, means for feeding material to the higher end of the mesh plate, a pivoted door at the lower end of the mesh plate and attached to a balance weight, a weir in the tank over which the coal passes, means for removing material from one part, and means for removing material from the other part.

5. Apparatus for washing coal and like material, comprising a tank divided into two parts, an inclined mesh plate, a reciprocating paddle in the tank and located directly beneath the mesh plate, valves in the paddle adapted to close during the forward stroke and open during the reverse stroke, means for reciprocating the paddle, means for feeding material to the higher end of the mesh plate, a pivoted door at the lower end of the mesh plate and attached to a balance weight, a dash pot adapted to control the movement of the door, a weir in the tank over which the coal passes, means for removing material from one part and means for removing material from the other part.

6. Apparatus for washing coal and like material, comprising a tank divided into two parts, an inclined mesh plate, a reciprocating paddle in the tank and located directly beneath the mesh plate, valves in the paddle adapted to close during the forward stroke and open during the reverse stroke, means for reciprocating the paddle, means for feeding material to the higher end of the mesh plate, scrapers reciprocating upon the mesh plate, a weir in the tank over which the coal passes, means for removing material from one part, and means for removing material from the other part.

7. Apparatus for washing coal and like material, comprising a tank divided into two parts, an inclined mesh plate pivoted at one end and attached to a balance weight at the other, a reciprocating paddle in the tank and located directly beneath the mesh plate, valves in the paddle adapted to close during the forward stroke and open during the reverse stroke, means for reciprocating the paddle, means for feeding material to the higher end of the mesh plate, scrapers reciprocating upon the mesh plate, a weir in the tank over which the coal passes, means for removing material from one part, and means for removing material from the other part.

8. Apparatus for washing coal and like material, comprising a tank divided into two parts, an inclined mesh plate, a reciprocating paddle in the tank and located directly beneath the mesh plate, valves in the paddle adapted to close during the forward stroke and open during the reverse stroke, means for reciprocating the paddle, means for feeding material to the higher end of the mesh plate, scrapers reciprocating upon the mesh plate, a pivoted door at the lower end of the mesh plate and attached to a balance weight, a weir in the tank over which the coal passes, means for removing material from one part, and means for removing material from the other part.

In testimony that I claim the foregoing as my invention I have signed my name this 5th day of August, 1921.

HENRY PATRICK HOYLE.